`US006046128A`

United States Patent

Kisen et al.

[11] Patent Number: 6,046,128
[45] Date of Patent: Apr. 4, 2000

[54] METHOD OF MANUFACTURING CATALYST FOR PURIFYING EXHAUST GAS

[75] Inventors: Tadashi Kisen; Yoshimi Kawashima, both of Sodegaura, Japan

[73] Assignee: Idemitsu Kosan Co., Ltd., Tokyo, Japan

[21] Appl. No.: 09/117,047

[22] PCT Filed: Nov. 27, 1996

[86] PCT No.: PCT/JP96/03471

§ 371 Date: Jul. 27, 1998

§ 102(e) Date: Jul. 27, 1998

[87] PCT Pub. No.: WO98/23373

PCT Pub. Date: Jun. 4, 1998

[51] Int. Cl.⁷ ............... B01J 27/14; B01J 21/00; B01J 29/18; B01J 8/00
[52] U.S. Cl. ............... 502/208; 502/77; 502/78; 502/344; 502/345; 502/353; 423/239.2; 423/DIG. 22; 423/DIG. 23; 423/DIG. 29; 423/DIG. 34
[58] Field of Search ............... 502/208, 77, 78, 502/87, 344, 345, 353; 423/239.2, DIG. 22, DIG. 23, DIG. 29, DIG. 34

[56] References Cited

U.S. PATENT DOCUMENTS

| | | |
|---|---|---|
| 2,386,518 | 9/1945 | Upham ................................. 502/353 |
| 3,493,325 | 2/1970 | Roth ..................................... 502/345 |
| 4,374,045 | 2/1983 | Chu ...................................... 252/455 |
| 4,547,482 | 10/1985 | Osugi et al. ........................ 502/345 |
| 4,849,392 | 7/1989 | Hums et al. ........................ 502/345 |
| 5,422,333 | 6/1995 | Kano et al. ....................... 423/239.2 |
| 5,427,753 | 6/1995 | Miura et al. ...................... 423/213.5 |
| 5,516,497 | 5/1996 | Speronello et al. ................ 423/235 |

*Primary Examiner*—Mark L. Bell
*Assistant Examiner*—Patricia L. Hailey
*Attorney, Agent, or Firm*—Oblon, Spivak, McClelland, Maier & Neustadt, P.C.

[57] ABSTRACT

A method of manufacturing a catalyst for purifying exhaust gas, the catalyst including a pentasil-type crystalline aluminosilicate catalyst carrier carrying thereon a copper component and a phosphorus component. The method is characterized by adding the catalyst carrier into a solution containing a copper component and a phosphorus component, or a buffer and having a predetermined pH adjusted with ammonia, and subsequently adding an acid to the solution so as to adjust the pH of the solution to 7.0 or less, to thereby incorporate the copper component and the phosphorus component into the catalyst carrier. According to the present invention, a catalyst for removing exhaust gases which is durable and which has a high $NO_x$ removal factor can be prepared in a stable manner.

7 Claims, No Drawings

METHOD OF MANUFACTURING CATALYST FOR PURIFYING EXHAUST GAS

This application is a 371 of PCT/JP96/03471, filed on Nov. 27, 1996.

BACKGROUND OF THE INVENTION

1. Field of the Invention

The present invention relates to a method of manufacturing a catalyst particularly useful for removing nitrogen oxides exhausted from transportable internal-combustion engines such as those used in gasoline-fueled automobiles and diesel-powered automobiles; stationary internal-combustion engines such as those used in cogeneration plants; combustors such as those used in boilers; furnaces of plants; etc., by reducing the nitrogen oxides to harmless gases.

2. Background Art

Generally, the exhaust gas exhausted from transportable or stationary internal-combustion engines, combustors, or furnaces of plants contains a large amount of nitrogen oxides ($NO_x$) such as NO or $NO_2$. These nitrogen oxides ($NO_x$) are considered to cause not only photochemical smog but also damage to the human respiratory system.

Conventionally, there has widely been known a method for decreasing the $NO_x$ content in exhaust gas, wherein $NO_x$ is removed through reduction, by use of a catalyst, with carbon monoxide or hydrocarbons contained in the exhaust gas.

Catalysts commonly used for such purposes include those prepared by incorporating metals, by ion-exchange, impregnation, etc., into a carrier formed of zeolite such as crystalline aluminosilicate.

In particular, even under high gas hourly space velocity (GHSV) conditions, a crystalline aluminosilicate catalyst carrying copper as a metal component can effectively remove nitrogen oxides ($NO_x$) from the exhaust gas containing a large amount of oxygen, by use of hydrocarbon as a reducing agent. Therefore, this type of catalyst is considered to be a promising catalyst for purifying exhaust gases from transportable or stationary internal-combustion engines.

However, the copper-on-crystalline aluminosilicate catalyst has poor durability to heat and steam; i.e., the valence, oxidation state, and dispersion state of copper incorporated in the catalyst are subject to change when the catalyst undergoes treatment with heat and steam. Thus, there remains a drawback that constant purification performance over prolonged periods is not obtained at temperatures of 600° C. or more or when the exhaust gas contains a large amount of moisture.

To overcome this drawback, in Japanese Patent Application Laid-Open (kokai) No. 6-134314 the present inventors disclosed, as a catalyst for purifying exhaust gas and having remarkably enhanced durability, a catalyst comprising a pentasil-type crystalline aluminosilicate catalyst carrier carrying thereon a copper component and a phosphorus component.

With an ion-exchange method, which is suited for homogeneous incorporation of the copper component and the phosphorus component, the pH ranges of mother solutions which are proper for incorporation of respective components in required amounts differ from each other. Consequently, the pH range where both components are simultaneously incorporated in proper amounts is too narrow to be satisfactorily maintained by industrial apparatuses.

Although respective components may sequentially be incorporated within pH ranges suited for the respective components, an increased number of incorporation steps is not industrially advantageous at all.

SUMMARY OF THE INVENTION

The present invention was made in view of the foregoing, and an object of the present invention is to provide a method of manufacturing, within a wide pH range and in a stable manner, a catalyst for purifying exhaust gas, the catalyst having excellent durability, containing a copper component and a phosphorus component, and being suited for purifying exhaust gas with high efficiency.

The present inventors have conducted earnest studies, and have found that the above object is effectively attained by elevating the pH of a solution used for incorporation of the copper component and the phosphorus component during an initial stage of incorporation and lowering the pH in the course of the incorporation step. The present invention was accomplished based on this finding.

Accordingly, the present invention provides the following.

(1) A method of manufacturing a catalyst for purifying exhaust gas, the catalyst comprising a pentasil-type crystalline aluminosilicate catalyst carrier carrying thereon at least a copper component and a phosphorus component, the method being characterized by adding the catalyst carrier into a solution containing at least a copper component, a phosphorus component, ammonia, and a buffer and having a pH of 8.0 or more, and subsequently adding an acid to the solution so as to adjust the pH of the solution to 7.0 or less, to thereby incorporate at least the copper component and the phosphorus component into the catalyst carrier.

(2) A method of manufacturing a catalyst for purifying exhaust gas as described in (1), wherein the pH of the solution before the catalyst carrier is added is 8.0–12.0.

(3) A method of manufacturing a catalyst for purifying exhaust gas, the catalyst comprising a pentasil-type crystalline aluminosilicate catalyst carrier carrying thereon at least a copper component and a phosphorus component, the method being characterized by adding the catalyst carrier into a solution containing at least a copper component, a phosphorus component, and ammonia, and having a pH of 9.0 or more, and subsequently adding an acid to the resultant solution so as to adjust the pH of the solution to 7.0 or less, to thereby incorporate at least the copper component and the phosphorus component into the catalyst carrier.

(4) A method of manufacturing a catalyst for purifying exhaust gas as described in (1), wherein the pH of the solution before the catalyst carrier is added is 9.0–12.0.

(5) A method of manufacturing a catalyst for purifying exhaust gas as described in any one of (1) through (4), wherein pentasil-type crystalline aluminosilicate has an MFI structure.

(6) A method of manufacturing a catalyst for purifying exhaust gas as described in (1) or (2), wherein the buffer is at least one species selected from among ammonium nitrate, ammonium chloride, ammonium acetate, and sodium acetate.

(7) A method of manufacturing a catalyst for purifying exhaust gas as described in any one of (1) through (6), wherein the acid is at least one species selected from among nitric acid, hydrochloric acid, and sulfuric acid.

PREFERRED EMBODIMENTS OF THE INVENTION

The preferred embodiments of the present invention will next be described in detail.

Firstly, the catalyst for purifying exhaust gas manufactured by the present invention will be described.

In the present invention, a catalyst for purifying exhaust gas is formed by incorporating a specific component into a catalyst carrier comprising pentasil-type crystalline aluminosilicate. Pentasil-type crystalline aluminosilicate is used as a catalyst carrier in the present invention, since crystalline aluminosilicates other than pentasil-type crystalline aluminosilicate have inherently poor hydrothermal durability, and durability against steaming decreases further when a phosphorus component is incorporated, thus such crystalline aluminosilicates are not suited for a catalyst carrier requiring long-term stability.

In the present invention, pentasil-type crystalline aluminosilicate refers to zeolite whose structural unit comprises an oxygen 5-membered ring, and examples thereof include ferrierite, mordenite, and ZSM-5 and ZSM-11 having an MFI structure. As used herein, the MFI structure refers to ZSM-5 or a structure similar to ZSM-5, and examples categorized as the MFI structure include ZSM-8, ZSM-11, ζ-1, ζ-3, Nu-4, Nu-5, TZ-1, TPZ-1, ISI-3, ISI-5, and AZ-1. These pentasil-type crystalline aluminosilicates may be respectively prepared through a known method.

Among these pentasil-type crystalline aluminosilicates, an alumnosilicate having an MFI structure is preferred in view of excellent hydrothermal durability, with ZSM-5 synthesized by use of mordenite as a seed crystal being particularly preferred. Also, among the above-described pentasil-type crystalline aluminosilicates, an aluminosilicate having a mole ratio ($SiO_2/Al_2O_3$) of 10–200 is preferred. When the mole ratio is less than 10, the hydrothermal durability of zeolite itself is low to thereby induce reduction of long-term stability of the corresponding catalyst, whereas when the mole ratio is in excess of 200, ion-exchanging capacity is limited to reduce the amount of active metal to be incorporated, resulting in poor catalyst activity. In the present invention, these pentasil-type crystalline aluminosilicates may be used singly or in combination of two or more species to form a catalyst carrier.

To the above-described pentasil-type crystalline aluminosilicates, there may be added a variety of compounds such as an oxide used for conventional catalyst carriers to form a catalyst carrier, so long as the compounds do not inhibit characteristics of the catalyst, such as performance for purifying exhaust gas. For example, silica, alumina, silica-alumina, magnesia, or zirconia may be incorporated to enhance the dispersibility of the copper component and the phosphorus component.

In the catalyst for purifying exhaust gas of the present invention, at least a copper component and a phosphorus component are incorporated in the above-described catalyst carrier.

In the present invention, the amount of the copper component incorporated into the catalyst carrier is preferably 0.8–30.0 wt. %, particularly preferably 2.0–15.0 wt. %, based on the total weight of the catalyst as reduced to CuO. When the content is less than 0.8 wt. %, the catalyst exhibits poor activity, due to the low copper content, whereas when the content is in excess of 30.0 wt. %, copper oxide (CuO), for example, aggregates on the surface of the catalyst carrier to plug up micropores of the catalyst carrier, which may sometimes cause reduction of the catalyst activity.

The amount of the phosphorus component incorporated is preferably 0.1–5.0 wt. %, particularly preferably 0.1–2.0 wt. %, based on the total weight of the catalyst as reduced to $P_2O_5$. When the content is less than 0.1 wt. %, the stability of the copper component is not fully ensured to thereby sometimes result in failure to obtain a catalyst exhibiting excellent hydrothermal durability, whereas when the content is in excess of 5.0 wt. %, improvement of the durability commensurate with the amount of incorporation is not obtained.

In the present invention, there may be incorporated components other than the copper component and phosphorus component so long as they do not adversely affect the catalyst activity and durability. For example, a metal component such as Co, Fe, Ga, or In may be incorporated in order to further enhance the catalyst activity. A metal component such as rare earth metal, alkaline earth metal or Zr, or halogen compound thereof may be incorporated in order to further enhance the durability of the catalyst. Such other components are incorporated typically in an amount of approximately 0.05–10 wt. % based on the total amount of the catalyst.

Next, a method of manufacturing a catalyst for purifying exhaust gas will be described.

In the first stage of the method of manufacturing a catalyst for purifying exhaust gas of the present invention, there is prepared a solution containing a copper compound and a phosphorus compound, which correspond to the copper component and the phosphorus component to be incorporated in the catalyst carrier.

As the solvent for preparing the solution for incorporation, there may be used solvents conventionally employed for preparation of a catalyst by, e.g., incorporating an active component into a catalyst carrier, and they may suitably be selected from among polar solvents such as water or alcohol (e.g., methanol, ethanol). Of these, water is preferably used in practice.

No particular limitation is imposed on the copper compound, and there may be used copper compounds such as inorganic acid salts, halides, organic acid salts, and complexes. Examples include inorganic acid salts such as copper nitrate or copper carbonate; halides such as copper fluoride, copper chloride, or copper bromide; organic acid salts such as copper acetate or copper oxalate; and complexes such as a copper ammine complex or a copper cyano complex. Of these copper compounds, inorganic acid salts are preferred in that they are easily incorporated homogeneously into the catalyst carrier, with copper nitrate being particularly preferred. These copper compounds may be used singly or in combination of two or more species.

No particular limitation is imposed on the phosphorus compound so long as it contains phosphorus and has solubility or compatibility to a solvent used, and there may be used phosphorus compounds such as inorganic phosphoric acids or salts thereof, or phosphorus chalcogenides. Examples of the inorganic phosphoric acids include (a) phosphoric acids having a variety of oxidation numbers of phosphorus such as orthophosphoric acid, metaphosphoric acid, hypophosphoric acid, phosphorous acid, or hypophosphorous acid; and (b) condensed phosphoric acids such as polyphosphoric acids—e.g., orthopyrophosphoric acid, metapyrophosphoric acid, tripolyphosphoric acid, and tetrapolyphosphoric acid—and polymetaphosphoric acids—e.g., trimetaphosphoric acid, tetrametaphosphoric acid, and hexametaphosphoric acid. Examples of the salts of the above-described inorganic phosphoric acids include alkali metal salts such as lithium salts, sodium salts, and potassium salts; and ammonium salts. These salts also include hydrogen salts such as dihydrogen alkali metal orthophosphates, monohydrogen alkali metal orthophosphate, dihydrogen ammonium orthophosphate, monohydrogen ammonium orthophosphate, monohydrogen alkali metal phosphite, and monohydrogen ammonium phosphite, as well as normal salts such as trialkali metal orthophosphates and triammonium orthophosphate. Examples of the phosphorus chalcogenide include phosphorus pentoxide, phosphorus trioxide, and phosphorus pentasulfide. Of these phosphorus compounds, lithium phosphates, sodium phosphates, and ammonium phosphates are preferred in that a catalyst having excellent heat resistance is easily obtained therefrom, with dihydrogen ammonium orthophosphate being particularly preferred. These phosphorus compounds may be used singly or in combination of two or more species.

The amount of the copper compound and that of the phosphorus compound contained in the solution for incorporation are not univocally specified, since they vary according to the amounts of respective components incorporated in the catalyst carrier or to conditions of incorporation such as temperature or pH of the solution. Typically, the amount is preferably 0.2–2.0 mmol/g-cat for the copper compound and 0.01–1.0 mmol/g-cat for the phosphorus compound. When the amount of the copper compound and that of the phosphorus compound are selected to be 2.0 mmol/g-cat or more and 1.0 mmol/g-cat or more, respectively, the copper component or the phosphorus component aggregates on the surface of the catalyst carrier to sometimes result in failure to obtain a catalyst having sufficient exhaust gas-purification ability. In contrast, when the amounts are selected to be 0.2 mmol/g-cat or less and 0.01 mmol/g-cat or less, respectively, the copper component or the phosphorus component is not incorporated or only a small amount of the component is incorporated through one incorporation operation, to require many repetitions of the incorporation operation, which is not practical.

When there is incorporated another component other than the copper component and the phosphorus component, a compound that contains the component and dissolves in a solvent to be used is appropriately chosen, and the compound is preferably dissolved in a solution containing the above copper component and phosphorus component for simultaneous incorporation, i.e., one-step incorporation operation. Alternatively, a customary incorporation treatment may be conducted separately before and after the incorporation of the copper component and the phosphorus component conducted in the present invention.

In the present invention, the pH of the solution is adjusted by adding ammonia after a buffer (or no buffer) is added to the solution.

The purpose of adjusting the pH is to form a sufficient amount of a copper complex in the solution. The pH is adjusted by use of ammonia, since a copper ammine complex formed is suitable for achieving a homogeneous incorporation of the copper component into the catalyst carrier in view of the ionic state, form, and size of the complex.

No particular limitation is imposed on the ammonia added, and commercially available aqueous ammonia or a solution containing ammonia is appropriately used as undiluted or diluted with a solvent used in the solution for incorporation. Generally, an ammonia source containing ammonia in an amount of 0.5 vol. % or more is preferably used. When the source having an ammonia content of less than 0.5 vol. % is used, a large amount of an ammonia solution must be added to adjust the pH, and the concentration of the copper component or the phosphorus component in the solution for incorporation considerably varies to adversely affect incorporation at the desired concentration.

In the embodiments of the present invention, the pH of the solution to be adjusted varies depending on whether the pH adjustment is effected by use of the below-described buffer or without use of the buffer.

That is, when no buffer is added, the pH is adjusted to be 9.0 or more, preferably 9.0–12.0, whereas when the buffer is added in advance, the pH is adjusted to be 8.0 or more, preferably 8.0–12.0. When the pH is adjusted to be less than 9.0 for the former case and less than 8.0 for the latter case, respectively, a sufficient amount of a copper ammine complex is not formed. Therefore, the copper component is not homogeneously incorporated in the catalyst carrier to result in deterioration of performance of the catalyst in purifying exhaust gas.

As mentioned above, the pH of the solution is adjusted after addition of a buffer in one embodiment of the present invention, since the copper ammine complex may be formed in a sufficient amount at the lower pH through addition of the buffer, and a phosphorus compound having high solubility is effectively incorporated into the catalyst carrier.

No particular limitation is imposed on the buffer used in the present invention, and commercially available buffers may be used appropriately. A buffer adjusting pH to 7.0 or more is preferred, since ammonia must be added in an amount larger than that required to adjust the pH of the solution to 8.0 or more when there is used a buffer adjusting pH to 7.0 or less. Examples of preferable buffers include ammonium nitrate, ammonium chloride, ammonium acetate, and sodium acetate. Of these, particularly preferred is a salt containing an ionic fragment which is also a fragment of the copper compound and the phosphorus compound used for preparing a solution containing the copper component and the phosphorus component. For example, when copper nitrate is used as the copper compound and dihydrogen ammonium phosphate is used as the phosphorus compound, ammonium nitrate is the most preferred buffer. The amount of the buffer used, depending on the kind of the buffer, is typically 2–6 mol/mol-Cu ions.

In the present invention, at least a copper component and a phosphorus component are incorporated into a catalyst carrier containing pentasil-type crystalline aluminosilicate, by use of the above-described pH-adjusted solution for incorporation. The incorporation method will next be described in detail.

With regard to the incorporation method of the present invention, a catalyst carrier containing pentasil-type crystalline aluminosilicate is added into the above-described solution for incorporation that is heated or cooled in a temperature range of 10–50° C., preferably 15–40° C., and the mixture is allowed to stand or is preferably stirred for 1–10 hours, preferably 1–5 hours. The copper component or the phosphorus component is ion-exchanged with cations of the catalyst carrier through the step. No particular limitation is imposed on the apparatus utilized for heating, cooling, or stirring, and customarily utilized apparatus may be utilized in the present invention.

After the treatment for the above-described time, pH of the solution is adjusted to 7.0 or less, preferably 6.5–4.0, by adding an acid to the solution. The reason for adjusting pH of the solution to 7.0 or less is to incorporate into the catalyst carrier the ion-unexchanged copper component or phosphorus component contained in the solution before pH adjustment.

No particular limitation is imposed on the acid for adjusting pH of the solution, and nitric acid, hydrochloric acid, or sulfuric acid may be used in the present invention. Of these, nitric acid is preferred in that a catalyst having excellent durability may be easily obtained.

Addition of the acid is preferably conducted at a pH descending rate of approximately 0.2–2/minute. When the rate is two or more, a copper component is easily incorporated into the surface of a catalyst in the form of aggregates to result in failure to obtain a catalyst exhibiting sufficient performance for purifying exhaust gas, whereas when the rate is 0.2 or less, the effect for preventing aggregation commensurate with the time consumed is not obtained.

The acid is added preferably under stirring in order to prevent the occurrence of a sudden local pH change in the solution.

In the present invention, the solution is further allowed to stand or stirred for 0.5–4 hours, preferably 0.5–2 hours with heating or cooling in a temperature range of 10–50° C., more preferably 15–40° C., after addition of the acid. The copper component or the phosphorus component contained in the solution is incorporated into the catalyst carrier in a desired amount through this step.

In the present invention, after incorporation of the copper component and the phosphorus component, the solution is filtered to recover a solid, which is washed and dried through a customary method. For example, filtration is typically conducted by use of a Buchner funnel, a pressure filtration apparatus, a filter press, etc., and the solid is dried in air at 100–200° C. for 6–24 hours. In the present invention, a desired amount of the copper component and the phosphorus component may typically be incorporated into the catalyst carrier through one step of incorporation, or through repeated steps of incorporation in order to realize further homogeneous incorporation of the copper component and the phosphorus component.

The thus-formed catalyst carrier carrying a desired amount of the copper component and a desired amount of the phosphorus component is fired through a customary method to thereby obtain a catalyst. For example, firing is conducted by use of an apparatus conventionally used for firing a catalyst, such as a muffle furnace or a rotary kiln, in air at 500–700° C. for 0.5–8 hours.

In the present invention, the fired catalyst may further be treated with a substance such as an acid, an alkali, steam, ammonia, a halogen, or other nonmetallic compound or with heat to provide a catalyst used in the present invention.

The obtained catalyst is normally in the form of powder and it may be used as is. The catalyst is preferably used after being formed into an arbitrary shape such as a spherical, columnar, star-like, or honeycomb shape through use of a binder such as silica, alumina, silica-alumina, magnesia, or zirconia depending on uses. Alternatively, the catalyst of the present invention may also be used by application of powder thereof on separately made carrier substrates having a variety of shapes. No particular limitation is imposed on the material used as such carrier substrates, and a variety of heat-resisting materials such as ceramics and metals may be selected and used. For example, as a catalyst for exhaust gas from automobiles, there is preferably used a catalyst comprising ceramics having excellent strength, especially at high temperatures, and long-term heat resistance, inter alia a honeycomb-shaped carrier substrate made of cordierite, coated with a powder of the catalyst of the present invention.

EXAMPLES

The present invention will next be described in detail by way of examples, which should not be construed as limiting the invention.

Example 1

Three solutions were prepared: a solution comprising aluminum sulfate dodecahydrate (337.5 g), 97% sulfuric acid (362.5 g), and water (8,250 g)(referred to as solution I); a solution comprising water glass ($SiO_2$: 28.5%, $Na_2O$ 9.5%, water 62%) (5,275 g) and water (5,000 g) (referred to as solution II); and a solution comprising sodium chloride (987.5 g) and water (2,300 g)(referred to as solution III).

Then, solution I and solution II were mixed while simultaneously being added dropwise into solution III. The pH of the raw material mixture was adjusted to 9.5 and mordenite ($SiO_2/Al_2O_3$) (mole ratio=2.0) (12.5 g) was added as seed crystals.

The raw material mixture was then placed in a 25-liter-autoclave, and stirred at 170° C. and 3,000 rpm under a sealed condition over 20 hours. After cooling, the reaction mixture was filtered to obtain a precipitate, which was thoroughly washed with pure water and dried at 120° C. for 20 hours to thereby synthesize crystalline pentasil-type aluminosilicate having ZSM-5 structure (MFI structure). Measurement results from powder X-ray diffraction of this aluminosilicate are shown in Table 1 below.

TABLE 1

| Interplanar distance (d) | Relative intensity | Interplanar distance (d) | Relative intensity |
|---|---|---|---|
| 11.5 | strong | 4.65 | strong |
| 10.3 | strong | 4.28 | weak |
| 9.1 | weak | 3.86 | very strong |
| 7.5 | weak | 3.75 | strong |
| 7.3 | weak | 3.46 | weak |
| 6.5 | weak | 3.06 | weak |
| 6.10 | weak | 2.99 | weak |
| 5.64 | weak | 2.96 | weak |
| 5.10 | weak | 2.00 | weak |

The ratio $SiO_2/Al_2O_3$ (mole ratio) of this aluminosilicate was 32. This aluminosilicate was then fired at 550° C. in an air stream for 6 hours.

A solution for incorporation containing a copper component and a phosphorus component was then prepared as follows: copper nitrate trihydrate (132.5 g), dihydrogen ammonium phosphate (11.17 g), and ammonium nitrate (178 g) were successively added into water (2,080 g) and 5% aqueous ammonia was added to the solution while solution temperature was controlled at 30° C. to adjust pH to 8.5. To the resultant solution, the above-described aluminosilicate (500 g) was added and the mixture was allowed to undergo ion-exchange for four hours while solution temperature was controlled at 30° C. Subsequently, 30% nitric acid was added to the solution to adjust pH to 6.0, and the mixture was allowed to undergo ion-exchange for an additional one hour. The resultant slurry solution was filtered to recover a solid, which was washed with water, dried at 120° C. for 24 hours, and fired at 500° C. for four hours to thereby obtain a target catalyst. The copper content of the catalyst as reduced to CuO was 7.5 wt. % and the phosphorus content thereof as reduced to $P_2O_5$ was 1.3 wt. %.

Next, performance for reduction-removing $No_X$ of the above-described catalyst was evaluated based on the below-described initial activity and activity after steaming treatment (hydrothermal treatment).

(1) Evaluation of Initial Activity

A sample of the obtained catalyst (2 cc) was introduced into a reaction tube made of stainless steel, and the tube was maintained at temperatures described below. A model gas was passed through the above-described reaction tube as a gas to be treated at GHSV=80,000 h$^{-1}$. The model gas comprised NO$_X$ (500 ppm), O$_2$ (6.0%), C$_3$H$_6$/C$_3$H$_8$ (C$_3$H$_6$/C$_3$H$_8$=2 (about 2,500 ppm as THC concentration)), and the balance nitrogen. The THC (total hydrocarbon) concentration refers to a concentration of hydrocarbons as reduced to methane. Then, the gas effused from the outlet of the reaction tube was introduced to a chemiluminescence analyzer to measure NO$_X$ content of the gas. A removal factor of NO$_X$ after catalytic reaction was calculated by comparison of the thus-obtained NO$_X$ content to concentration of NO$_X$ in the model gas before introduction to the reaction tube. The removal factor of NO$_X$ was evaluated at temperatures of the reaction tube of 300° C., 350° C., and 400° C., respectively. The results are shown in Table 2.

(2) Evaluation of Activity After Steaming Treatment (hydrothermal treatment)

A sample of the catalyst prepared in Examples of the present invention was introduced into a reaction tube made of quartz, and the tube was maintained at 750° C. A nitrogen gas containing C$_3$H$_6$/C$_3$H$_8$ (C$_3$H$_6$/C$_3$H$_8$=2 (about 2,500 ppm as THC concentration)), O$_2$ (0.5%), and water (10 vol. %) was introduced into the tube at GHSV=80,000 h$^{-1}$ over 16 hours to conduct steaming treatment.

After cooling the reaction tube, the catalyst recovered from the tube was introduced into a reaction tube made of stainless steel, and removal factor of NO$_X$ to the model gas was evaluated under the conditions identical to those at the above-described evaluation of initial activity. The results are shown in Table 2.

Example 2

The procedure of Example 1 was conducted through use of 5% aqueous ammonia instead of ammonium nitrate, to adjust pH of the solution to 11.5 and thereby prepare a catalyst of Example 2. The copper content of the catalyst as reduced to CuO was 6.7 wt. % and the phosphorus content thereof as reduced to P$_2$O$_5$ was 1.1 wt. %.

Example 3

The procedure of Example 1 was conducted through use of ammonium carbonate instead of ammonium nitrate, to thereby prepare a catalyst of Example 3. The copper content of the catalyst as reduced to CuO was 6.0 wt. % and the phosphorus content thereof as reduced to P$_2$O$_5$ was 1.2 wt. %.

Example 4

The procedure of Example 1 was conducted through use of ammonium pyrophosphate instead of dihydrogen ammonium phosphate, to thereby prepare a catalyst of Example 4. The copper content of the catalyst as reduced to CuO was 7.3 wt. % and the phosphorus content thereof as reduced to P$_2$O$_5$ was 0.8 wt. %.

Comparative Example 1

The procedure of Example 2 was conducted except that adjustment of pH of the solution through use of 5% aqueous ammonia (pH of the solution, 2.5) and that through use of nitric acid were omitted, to thereby prepare a catalyst of Comparative Example 1. The copper content of the catalyst as reduced to CuO was 2.6 wt. % and the phosphorus content thereof as reduced to P$_2$O$_5$ was 0.2 wt. %.

Comparative Example 2

The procedure of Example 2 was conducted through use of 5% aqueous ammonia to adjust pH of the solution to 6.0, to thereby prepare a catalyst of Comparative Example 2. The copper content of the catalyst as reduced to CuO was 6.0 wt. % and the phosphorus content thereof as reduced to P$_2$O$_5$ was 1.0 wt. %.

Comparative Example 3

The procedure of Example 2 was conducted except that adjustment of pH of the solution through use of nitric acid was omitted, to thereby prepare a catalyst of Comparative Example 3. The copper content of the catalyst as reduced to CuO was 3.2 wt. % and the phosphorus content thereof as reduced to P$_2$O$_5$ was 0.01 wt. %.

Initial activity and activity after steaming (hydrothermal) treatment were evaluated for catalysts of Examples 2 to 4 and Comparative Examples 1 to 3 under conditions identical to those of Example 1. The results are shown in Table 2.

TABLE 2

| Catalyst | Initial activity | | | Activity after hydrothermal treatment | | |
|---|---|---|---|---|---|---|
| No. | 300° C. | 350° C. | 400° C. | 300° C. | 350° C. | 400° C. |
| Ex. 1 | 57 | 86 | 82 | 30 | 68 | 78 |
| Ex. 2 | 50 | 81 | 81 | 25 | 61 | 75 |
| Ex. 3 | 44 | 77 | 80 | 20 | 58 | 69 |
| Ex. 4 | 54 | 84 | 81 | 15 | 54 | 65 |
| Comp. Ex. 1 | 38 | 60 | 68 | 2 | 13 | 20 |
| Comp. Ex. 2 | 22 | 30 | 43 | 1 | 15 | 21 |
| Comp. Ex. 3 | 34 | 65 | 70 | 1 | 18 | 30 |

As shown in Table 2, the catalysts of the present invention achieve high removal factors of NO$_X$ even after steaming treatment and consequently exhibit excellent durability. Also, Table 2 shows extremely low removal factors of NO$_X$ after steaming treatment for Comparative Example 1, in which pH of the solution is not adjusted to result in almost no formation of a copper ammine complex and no substantial ion-exchange via copper aqua ions. Similar to the case of Comparative Example 1, extremely low removal factors of NO$_X$ after steaming treatment as compared with that of the present invention are obtained for Comparative Example 2, in which pH of the solution is adjusted to as low as 6.0 to result in poor formation of a copper ammine complex. Moreover, extremely low removal factors of NO$_X$ after steaming treatment are obtained for Comparative Example 3, in which pH of the solution is not adjusted by use of an acid to result in almost no incorporation of a phosphorus component.

As described above, the method of manufacturing a catalyst for purifying exhaust gas according to the present invention provides a catalyst for purifying exhaust gas having high durability and efficiency.

What is claimed is:

1. A method of manufacturing a catalyst for purifying exhaust gas, the catalyst comprising a pentasil-type crystalline aluminosilicate catalyst carrier carrying thereon at least a copper component and a phosphorus component, the method being characterized by adding the catalyst carrier into a solution containing at least a copper component, a phosphorus component, ammonia, and a buffer and having a pH of 8.0 or more, and subsequently adding an acid to the solution so as to adjust the pH of the solution to 7.0 or less, to thereby incorporate at least the copper component and the phosphorus component into the catalyst carrier.

2. A method of manufacturing a catalyst for purifying exhaust gas according to claim 1, wherein the pH of the solution before the catalyst carrier is added is 8.0–12.0.

3. A method of manufacturing a catalyst for purifying exhaust gas, the catalyst comprising a pentasil-type crystalline aluminosilicate catalyst carrier carrying thereon at least a copper component and a phosphorus component, the method being characterized by adding the catalyst carrier into a solution containing at least a copper component, a phosphorus component, and ammonia, and having a pH of 9.0 or more, and subsequently adding an acid to the resultant solution so as to adjust the pH of the solution to 7.0 or less, to thereby incorporate at least the copper component and the phosphorus component into the catalyst carrier.

4. A method of manufacturing a catalyst for purifying exhaust gas according to claim 1, wherein the pH of the solution before the catalyst carrier is added is 9.0–12.0.

5. A method of manufacturing a catalyst for purifying exhaust gas according to claim 1, wherein pentasil-type crystalline aluminosilicate has an MFI structure.

6. A method of manufacturing a catalyst for purifying exhaust gas according to claim 1, wherein the buffer is at least one species selected from among ammonium nitrate, ammonium chloride, ammonium acetate, and sodium acetate.

7. A method of manufacturing a catalyst for purifying exhaust gas according to claim 1, wherein the acid is at least one species selected from among nitric acid, hydrochloric acid, and sulfuric acid.

* * * * *